(12) United States Patent
Bogan

(10) Patent No.: US 9,542,732 B2
(45) Date of Patent: Jan. 10, 2017

(54) EFFICIENT IMAGE TRANSFORMATION

(71) Applicant: Cognex Corporation, Natick, MA (US)

(72) Inventor: Nathaniel Bogan, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/678,299

(22) Filed: Apr. 3, 2015

(65) Prior Publication Data

US 2016/0292832 A1    Oct. 6, 2016

(51) Int. Cl.
*G06T 5/00* (2006.01)
*G06T 5/50* (2006.01)
*G06T 3/00* (2006.01)

(52) U.S. Cl.
CPC ............. *G06T 5/006* (2013.01); *G06T 3/0075* (2013.01); *G06T 5/50* (2013.01); *G06T 2207/20221* (2013.01)

(58) Field of Classification Search
CPC .......... G06T 5/006; G06T 3/0075; G06T 5/50; G06T 2207/20221; G06T 5/001; G06T 3/4053; G06T 3/0081; G06T 2200/12; G06T 2200/32; G06T 3/0006; G06T 3/0093; H04N 5/349; H04N 9/3185; G02B 27/0025; G01M 11/0242; G06K 9/0063; G06K 9/2036; G06K 9/46; G01N 15/1468
See application file for complete search history.

(56) References Cited

U.S. PATENT DOCUMENTS

| | | | |
|---|---|---|---|
| 4,829,587 A | 5/1989 | Glazer et al. | |
| 5,054,097 A * | 10/1991 | Flinois | G06T 5/006 348/181 |
| 5,299,308 A * | 3/1994 | Suzuki | G06K 15/1209 101/211 |
| 5,519,823 A * | 5/1996 | Barkans | G09G 5/20 345/443 |
| 5,872,902 A * | 2/1999 | Kuchkuda | G06T 15/503 345/615 |
| 6,449,664 B1 | 9/2002 | Honary et al. | |
| 6,608,631 B1 * | 8/2003 | Milliron | G06T 13/00 345/619 |
| 6,683,617 B1 * | 1/2004 | Naoi | G06T 15/503 345/611 |
| 6,756,993 B2 * | 6/2004 | Popescu | G06T 15/205 345/422 |

(Continued)

OTHER PUBLICATIONS

Catmull, E. and Smith, A. R., "3-D Transformations of Images in Scanline Order," ACM SIGGRAPH Computer Graphics, vol. 14, No. 3, pp. 279-285 (1980).

(Continued)

*Primary Examiner* — Manav Seth
(74) *Attorney, Agent, or Firm* — Wilmer Cutler Pickering Hale and Dorr LLP

(57) ABSTRACT

The present disclosure provides a multi-stage image mapping mechanism for mapping a distorted image to a rectified image. For example, the multi-stage image mapping mechanism can remove homography from a distorted image to reconstruct a rectified image in two-stages: (1) a first stage in which distortion is partially removed from a distorted image to generate an intermediate image, and (2) a second stage in which residual distortion is removed from the intermediate image to recover the rectified image.

20 Claims, 6 Drawing Sheets

(56) References Cited

U.S. PATENT DOCUMENTS

| | | | |
|---|---|---|---|
| 6,791,616 B2* | 9/2004 | Tamaki | H04N 5/217 348/187 |
| 7,239,331 B2* | 7/2007 | Chernichenko | G06T 5/006 345/427 |
| 7,369,140 B1* | 5/2008 | King | G06T 15/503 345/421 |
| 7,403,658 B2 | 7/2008 | Lin et al. | |
| 7,456,846 B1* | 11/2008 | King | G06T 15/005 345/613 |
| 7,583,858 B2 | 9/2009 | Gallagher | |
| 7,599,512 B2* | 10/2009 | Shimizu | G06K 9/46 382/100 |
| 7,737,967 B2* | 6/2010 | Chernichenko | G06T 5/006 345/419 |
| 7,738,706 B2 | 6/2010 | Aradhye et al. | |
| 7,769,236 B2 | 8/2010 | Fiala | |
| 7,780,084 B2 | 8/2010 | Zhang et al. | |
| 7,800,628 B2* | 9/2010 | Harville | G06F 3/1446 345/589 |
| 7,821,570 B2 | 10/2010 | Gallagher et al. | |
| 7,929,043 B2 | 4/2011 | Tsubaki et al. | |
| 7,932,883 B2* | 4/2011 | Klompenhouwer | G09G 3/3413 345/589 |
| 8,023,144 B2 | 9/2011 | Case et al. | |
| 8,379,014 B2* | 2/2013 | Wiedemann | G06K 9/00201 345/419 |
| 8,681,224 B2* | 3/2014 | Mallon | G01M 11/0264 348/180 |
| 8,836,766 B1* | 9/2014 | Hebert | H04N 13/0275 348/135 |
| 8,928,730 B2* | 1/2015 | Stec | G06T 5/006 348/36 |
| 8,995,793 B1* | 3/2015 | Laflen | G06T 7/40 382/299 |
| 9,313,519 B2* | 4/2016 | Lou | H04N 19/46 |
| 2005/0180632 A1 | 8/2005 | Aradhye et al. | |
| 2005/0243103 A1 | 11/2005 | Rudolph | |
| 2006/0078215 A1 | 4/2006 | Gallagher | |
| 2006/0133641 A1* | 6/2006 | Shimizu | G06K 9/46 382/100 |
| 2008/0013119 A1 | 1/2008 | Case et al. | |
| 2008/0069203 A1* | 3/2008 | Karczewicz | G06T 3/4007 375/240.01 |
| 2009/0096790 A1* | 4/2009 | Wiedemann | G06K 9/00201 345/427 |
| 2010/0104139 A1* | 4/2010 | Kuehnle | G06K 9/00798 382/106 |
| 2014/0168461 A1 | 6/2014 | Dani et al. | |
| 2015/0009207 A1 | 1/2015 | Guo et al. | |
| 2015/0062369 A1 | 3/2015 | Gehring et al. | |
| 2015/0269737 A1* | 9/2015 | Lam | G06T 5/001 382/154 |
| 2015/0317525 A1* | 11/2015 | Stein | H04N 7/18 382/104 |

OTHER PUBLICATIONS

Szeliski, et al., "High-quality Multi-pass Image Resampling," Microsoft Research, Redmond, WA, Tech. Rep. MSR-TR-2010-10, 23 pgs. (2010).

Chen, et al., "Robust Homography for Real-Time Image Undistortion," 2013 International Conference on 3D Imaging, pp. 1-8, Dec. 3-5, 2013.

Geetha Kiran, A., & Murali, S., "Automatic Rectification of Perspective Distortion from a Single Image Using Plane Homography," International Journal on Computational Sciences & Applicaitons (IJCSA), vol. 3, No. 5, pp. 47-58 (Oct. 2013).

Malts, et al., "Deeper Understanding of the Homography Decomposition for Vision-Based Control," INRIA Institut National deRecherche en Informatique et an Automatique, 91 pgs. total (Sep. 2007).

* cited by examiner

EFFICIENT IMAGE TRANSFORMATION

CROSS REFERENCE TO RELATED APPLICATIONS

This application is related to U.S. patent application Ser. No. 14/678,279, entitled "HOMOGRAPHY RECTIFICATION," filed on the even-date herewith, the entire content of which is herein incorporated by reference.

TECHNICAL FIELD

Disclosed herein are apparatus, systems, and methods that relate to rectifying a homographic projection of an image for image processing applications.

BACKGROUND

Digital images can be formed by many devices and used for many practical purposes. Devices include cameras with image sensors operating on visible or infrared light, such as a charge-coupled device (CCD) image sensor or a complementary metal-oxide-semiconductor (CMOS) image sensor, line-scan sensors, flying spot scanners, electron microscopes, X-ray devices including computed tomography (CT) scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many other applications.

To serve these applications, the images formed by the various devices can be analyzed by machine vision systems to extract appropriate information. One form of analysis that is of considerable practical importance is determining the position, orientation, and size of patterns in an image that correspond to objects in the field of view of the imaging device. Pattern detection methods are of particular importance in industrial automation, where they are used to guide robots and other automation equipment in semiconductor manufacturing, electronics assembly, pharmaceuticals, food processing, consumer goods manufacturing, and many others.

Pattern detection methods can operate on images that have been subject to perspective distortions. However, the perspective distortions tend to increase the computational complexity and the computing time of pattern detection methods. Therefore, as a preprocessing step, images can be rectified to remove perspective distortions prior to performing the pattern detection methods.

SUMMARY

In accordance with the disclosed subject matter, apparatus, systems, and methods are provided for rectifying a homographic distortion of an image for image processing applications.

Some embodiments include a machine vision system. The system can include a processor configured to run a computer program stored in memory. The computer program can be configured to cause the processor to receive a first image and a first transform associated with the first image, wherein the first transform relates the first image to a second image, and is constrained to map a plurality of pixels along a dimension of the second image to a plurality of locations along a dimension of the first image, determine, for a first pixel of the plurality of pixels, a coordinate of a corresponding first location in the first image, select one of a plurality of kernels based on a sub-pixel phase associated with the coordinate of the first location, wherein the sub-pixel phase is indicative of a sub-pixel offset of the first location from a pixel grid of the first image, and generate the second image from the first image by, in part, applying the selected kernel on at least one pixel around the first location in the first image to determine an image value for the first pixel in the second image.

In some embodiments, the processor is configured to determine the coordinate of the first location by operating the first transform on a coordinate of the first pixel.

In some embodiments, the processor is configured to determine, for a second pixel of the plurality of pixels, a coordinate of a corresponding second location in the first image by adding a constant to the coordinate of the first location.

In some embodiments, the processor is configured to select a second one of the plurality of kernels based on a sub-pixel phase associated with the coordinate of the second location, and generate the second image from the first image by, in part, applying the second one of the plurality of kernels on at least one pixel around the second location in the first image to determine an image value for the second pixel in the second image.

In some embodiments, the processor is configured to receive a second transform associated with the second image, wherein the second transform relates the second image to a third image, and is constrained to map a plurality of pixels along a dimension of the third image to a plurality of locations along the dimension of the second image, determine, for a first pixel of the third image, a coordinate of a corresponding first location of the third image, select one of the plurality of kernels based on a sub-pixel phase associated with the coordinate of the first location in the third image, and generate the third image from the second image by, in part, applying the one of the plurality of kernels on at least one pixel around the first location of the third image to determine an image value for the first pixel of the third image.

Some embodiments include a method for operating the disclosed system or the disclosed non-transitory computer readable medium. The method includes receiving a first image and a first transform associated with the first image, wherein the first transform relates the first image to a second image, and is constrained to map a plurality of pixels along a dimension of the second image to a plurality of locations along a dimension of the first image, determining, for a first pixel of the plurality of pixels, a coordinate of a corresponding first location in the first image, selecting one of a plurality of kernels based on a sub-pixel phase associated with the coordinate of the first location, wherein the sub-pixel phase is indicative of a sub-pixel offset of the first location from a pixel grid of the first image, and generating the second image from the first image by, in part, applying the selected kernel on at least one pixel around the first location in the first image to determine an image value for the first pixel in the second image.

In some embodiments, determining the coordinate of the first location comprises operating the first transform on a coordinate of the first pixel.

In some embodiments, the method further comprises determining, for a second pixel of the plurality of pixels, a coordinate of a corresponding second location in the first image by adding a constant to the coordinate of the first location.

In some embodiments, the method further comprises selecting a second one of the plurality of kernels based on a sub-pixel phase associated with the coordinate of the second location, and generating the second image from the first image by, in part, applying the second one of the plurality of kernels on at least one pixel around the second location in the first image to determine an image value for the second pixel in the second image In some embodiments, the method further comprises receiving a second transform associated with the second image, wherein the second transform relates the second image to a third image, and is constrained to map a plurality of pixels along a dimension of the third image to a plurality of locations along the dimension of the second image, determining, for a first pixel of the third image, a coordinate of a corresponding first location of the third image, selecting one of the plurality of kernels based on a sub-pixel phase associated with the coordinate of the first location in the third image, and generating the third image from the second image by, in part, applying the one of the plurality of kernels on at least one pixel around the first location of the third image to determine an image value for the first pixel of the third image.

Some embodiments include a non-transitory computer readable medium having executable instructions associated with a homography decomposition module and a homography removal module. The modules are operable to cause a machine vision system to receive a first image and a first transform associated with the first image, wherein the first transform relates the first image to a second image, and is constrained to map a plurality of pixels along a dimension of the second image to a plurality of locations along a dimension of the first image, determine, for a first pixel of the plurality of pixels, a coordinate of a corresponding first location in the first image, select one of a plurality of kernels based on a sub-pixel phase associated with the coordinate of the first location, wherein the sub-pixel phase is indicative of a sub-pixel offset of the first location from a pixel grid of the first image, and generate the second image from the first image by, in part, applying the selected kernel on at least one pixel around the first location in the first image to determine an image value for the first pixel in the second image.

In some embodiments, the executable instructions are further operable to cause the machine vision system to determine, for a second pixel of the plurality of pixels, a coordinate of a corresponding second location in the first image by adding a constant to the coordinate of the first location.

In some embodiments, the plurality of kernels correspond to an identical function that is sampled at a plurality of sub-phases.

In some embodiments, the first transform and the second transform collectively represent an affine transformation.

In some embodiments, the first transform comprises a down-sampling operation.

In some embodiments, the first transform comprises a first transformation matrix.

The disclosed apparatus, systems, and methods described herein can improve the efficiency of rectifying homographic distortions in a distorted image by mapping the distorted image to a rectified image using a multi-stage rectification process. Each stage of the rectification process is designed to reduce the computation and to reduce the amount of time needed to access images from memory.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
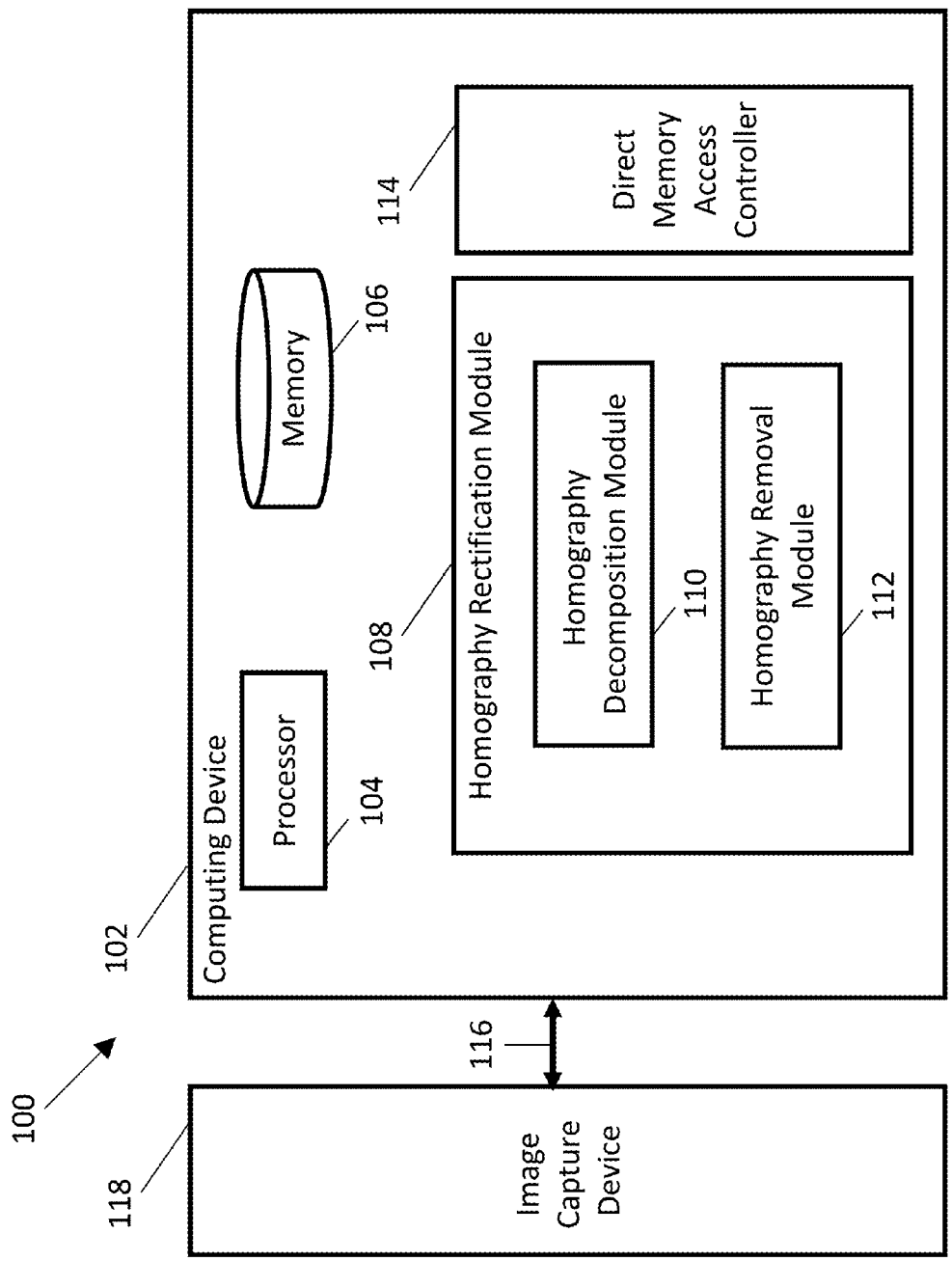
FIG. 1 shows a machine vision system for rectifying a homography of a distorted image in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

An image can include a two-dimensional function whose values correspond to physical characteristics of an object, such as brightness (radiant energy, reflected or otherwise), color, temperature, height above a reference plane, etc., and measured by any image-forming device, or whose values correspond to simulated characteristics of an object, and generated by any data processing device. An image can be regarded as a two-dimensional matrix, where each bin (e.g., a pixel) in the two-dimensional matrix is associated with a value or a set of values. Each pixel can be identified using a two-dimensional coordinate (x, y). In some embodiments, a row of an image can be identified by a set of pixels having an identical y-coordinate; a column of an image can be identified by a set of pixels having an identical x-coordinate.

A distorted image can include an image that has been subject to distortions, for example, due to a perspective effect. A distorted image can be disposed on an image plane, and it can represent a perspective view of an object plane. Therefore, parallel lines on an object plane may converge on the image plane, either within the distorted image or outside of the distorted image.

A rectified image can include an image that is recovered by removing distortions (e.g., a perspective effect) from the distorted image. The rectified image can be disposed on an object plane, and it can represent an orthographic view of the object plane. In the rectified image, a vanishing line of an object plane can be the line at infinity.

Image processing can refer to an automated analysis of images to determine the characteristics of features shown in them. It is used, for example, in automated manufacturing lines, where images of parts are analyzed to determine placement and alignment prior to assembly. It is also used, for example, in quality assurance where images of packages are analyzed to insure that product labels, lot numbers, and "freshness" dates are properly positioned and legible.

Image processing has non-industrial applications as well. In biotechnology research, for example, it can be used to identify constituents of microscopically imaged samples, or growth patterns in culture media. On the macroscopic scale, it can be used in astronomical research to find objects in time-lapse images. Meteorological, agricultural and defense applications of image processing include the detection and analysis of objects in satellite images.

One image processing technique for improving the accuracy of object/pattern/feature detection is homography rectification. Homography refers to a relationship between two images of the same planar surface in space. Homography has an application in image rectification, which can refer to a process for mapping a distorted image to a rectified image on a common image plane on which a vanishing line become a line at infinity. This transformation process can be referred to as a homography rectification. In some sense, homography rectification removes distortions introduced by perspective properties of an imaging system.

In homography rectification, once the homography (e.g., a mapping between the distorted image and the rectified image) is known, an image mapping technique can be used to remove the homography from the distorted image to recover the rectified image. This removal operation can include one or more image processing operations, which may include one or more of resizing, translation, rotation, skewing, and/or other image transformation operations.

Conventional image mapping techniques are unfortunately slow and too computationally intensive for most image processing applications. Conventional image mapping techniques often identify, for every pixel location in the rectified image, a corresponding pixel location in the distorted image, and the value of the corresponding pixel location in the distorted image is copied to the associated pixel location in the rectified image to complete the mapping. In a simplistic example, every pixel coordinate position in the rectified image maps directly to an existing pixel in the source. Thus, for example, the pixel at coordinate (4, 10) in the rectified image maps to coordinate (2, 5) in the distorted image; the pixel at (6, 10) in the rectified image maps to (3, 5) in the distorted image; and so on.

However, rarely do pixels in the rectified image map directly to grid positions in the distorted image. Thus, for example, a pixel at a coordinate (4, 10) in the rectified image may map to a location that is off from the pixel grid by a sub-pixel, e.g., a coordinate (2.5, 5.33), in the distorted image. This may necessitate interpolation and/or filtering to determine appropriate image values at the determined location. In the example provided above, an appropriate intensity for the pixel at coordinate (4, 10) in the rectified image might be determined as a weighted average of the intensities for the source pixel locations (2, 5), (3, 5), (2, 6), and (3, 6). Hereinafter, the term location is used to refer to a coordinate in a plane, which may or may not be located on a pixel grid.

Such image mapping techniques are usually both computationally expensive and time consuming because the corresponding pixel(s) in the distorted image must be independently identified for each pixel in the rectified image.

Furthermore, such image mapping techniques are generally inefficient in their memory usage because they access pixels stored in memory in a manner that is not aligned to the memory structure (e.g., the way data is stored in memory). For example, when an image mapping technique uses one or more pixels in the distorted image to interpolate an image value for a pixel in the rectified image, the one or more pixels are fetched from memory. Certain kinds of memory, such as dynamic random access memory (DRAM), have a property that access to sequential memory locations (e.g., consecutive x coordinates in an image) is generally much faster than non-sequential access. Therefore, the order in which the one or more pixels are accessed from the memory or the order in which the one or more pixels are written to the memory can be critical for fast memory access operations. Unfortunately, conventional image mapping techniques do not guarantee that the order in which the one or more pixels are fetched would be favorable to memory. Because the one or more pixels accessed from the memory may not correspond to sequential memory locations in the memory, retrieving pixels from the memory can be time-consuming.

Some of the issues associated with conventional image mapping techniques were addressed to a certain degree in *3D Transformations of Images in Scanline Order* (Catmull and Smith, 1980). Catmull shows a method that decomposes an image mapping process into multiple stages so that pixels on the distorted image—referred to as source pixels—corresponding to a pixel in the rectified image—referred to as a destination pixel—are located in sequential locations in memory. However, Catmull's method still requires performing substantial computation, notably a division, for each destination pixel. Catmull appears to have combined its method with specialized hardware to improve the computational speed, but its method is not amenable to be efficiently performed on a general-purpose processor.

Some of the issues associated with conventional image mapping techniques were also addressed to a certain degree in *High-quality multi-pass image resampling* (Szeliski et al, 2010). Szeliski discloses methods for performing some classes of image mapping that arguably has certain desired properties. However, Szeliski's methods do not apply to homographic/perspective image mapping. In fact, Szeliski concedes that it "[has] not yet fully developed the theory of optimal multi-pass perspective algorithms because achieving full computational efficiency is tricky." Therefore, there is a need to improve the efficiency of computation and memory access for homographic/perspective image mapping.

The present disclosure provides a multi-stage image mapping mechanism for mapping a distorted image to a rectified image. For example, the multi-stage image mapping mechanism can remove homography from a distorted image to reconstruct a rectified image in two-stages: (1) a first stage in which distortion is partially removed from a distorted image to generate an intermediate image, and (2) a second stage in which residual distortion is removed from the intermediate image to recover the rectified image. The multi-stage mechanism can be advantageous because it can allow each stage to be efficient in (1) identifying correspondence between pixels in two images, (2) accessing pixels from memory, and (3) filtering pixels to determine image values.

To this end, the multi-stage image mapping mechanism decomposes a homography transformation H into two separate transformations: a first transformation A and a second transformation B. Therefore, $$H = A*B$$

Under this representation, the second transformation B is designed to map a coordinate of an object plane (e.g., a plane associated with a rectified image) to a coordinate of an intermediate image plane (e.g., a plane associated with an intermediate image), and the first transformation A is designed to map a coordinate of the intermediate image plane to a coordinate of an image plane (e.g., a plane associated with a distorted image). Therefore, the first stage of the multi-stage image mapping mechanism can be thought of as removing the first transformation A from the distorted image to generate an intermediate image, and the second stage of the multi-stage image mapping mechanism can be thought of as removing the second transformation B from the intermediate image to generate a rectified image.

In the proceeding description, a source image refers to an image that is provided as an input to one of decomposed transformations of homography (e.g., a first transform A or a second transform B), and a destination image refers to an image that is provided as an output from one of decomposed transformations of homography (e.g., a first transform A or a second transform B). For example, for the second transform B, the source image is the rectified image and the destination image is the intermediate image; and for the first transform A, the source image is the intermediate image and the destination image is the distorted image.

In some embodiments, one or more of the decomposed transformations (A and/or B) are designed to map all pixels of a source image having a particular y-coordinate to pixels of a destination image having a fixed y-coordinate. In one example, the first transform A is configured to map a row of a source image to a row of a destination image. This feature allows a majority of memory accesses for the source image and/or the destination image to be aligned with the memory structure, thereby reducing cache misses and reducing the access time for accessing the external memory.

In some embodiments, one or more of the decomposed transformations (A and/or B) are configured to map pixels in a particular row of a source image to locations that are equidistant from adjacent locations in a fixed row of a destination image. For example, pixels $(1, y_0), (2, y_0), (3, y_0)$ in the source image (e.g., intermediate image for the first transform A) can be mapped to pixels $(2, y_1), (4, y_1), (6, y_1)$ in the destination image (e.g., distorted image for the first transform A). As before, the fixed row of a destination image may be offset from the pixel grid by a sub-pixel value. Therefore, the coordinate $y_1$ can be a fractional coordinate value (e.g., 3.5).

In some embodiments, because the distance between locations in the destination image is constant (referred to as a "sampling constant"), the image mapping technique need not independently compute locations in the destination image corresponding to pixels in a particular row of a source image. Instead, once the image mapping technique identifies a first location in the destination image that corresponds to a first pixel in a source image, the image mapping technique can use the first location as a reference point to determine (e.g., by simply adding the sampling constant to the x-coordinate of the first location) a second location corresponding to an adjacent pixel in the same row as the first pixel in the source image. This characteristic of decomposed transformations reduces the amount of computation needed for identifying one or more locations in the destination image that correspond to pixels in a source image.

FIG. 1 shows a machine vision system 100 for rectifying a homography of a distorted image in accordance with some embodiments. The system 100 can include a computing device 102, which includes a processor 104, memory 106, a homography rectification (HR) module 108, a direct memory access (DMA) controller 114, and an interface 116. The system 100 can also include an image capture device 118, which can generate an image of a scene.

In some embodiments, the processor 104 can execute instructions and one or more memory devices 106 can store instructions and/or data. The memory device 106 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory device 106 can be used to temporarily store data. The memory device 106 can also be used for long-term data storage. The processor 104 and the memory device 106 can be supplemented by and/or incorporated into special purpose logic circuitry.

In some embodiments, the HR module 108 can include a homography decomposition module 110 and a homography removal module 112.

The homography decomposition module 110 can be configured to receive a representation of homography to be removed from a distorted image, and determine decomposed transformations corresponding to the homography. The decomposed transformations can include, for example, a first transform A to be removed from a distorted image to generate an intermediate image, and a second transform B to be removed from the intermediate image to generate a rectified image. In some embodiments, the decomposed transformations can include more than two transforms, e.g., three or four transforms, that may be sequentially removed from the distorted image to generate a rectified image.

The homography decomposition module 110 can constrain one or more of the decomposed transformations so that all pixels in a particular row of a source image are mapped to a fixed y-coordinate of a destination image. The fixed y-coordinate may be an integer, in which case all pixels in a particular row of a source image are mapped to a fixed row of a destination image. Also, the homography decomposition module 110 can constrain one or more of the decomposed transformations so that pixels in a particular row of a source image are mapped to locations that are equidistant from each other in a fixed y-coordinate of a destination image.

The homography removal module 110 can be configured to remove decomposed transformation from the distorted image to recover the rectified image. For example, the homography removal module 110 can remove the first transform A from the distorted image to generate an intermediate image, and remove the second transform B from the intermediate image to recover a rectified image. In some embodiments, the homography removal module 110 can down-sample a row of a destination image to remove a decomposed transformation from the destination image. In this case, the homography removal module 110 can down-sample each row of the destination image with a different sampling rate to account for the projective distortion of the decomposed transformation.

In some embodiments, the homography removal module 110 can be configured to down-sample a destination image as a part of the decomposed transformation removal process. This can be done by appropriately scaling decomposed transformations, e.g., by a down-sampling rate.

In some embodiments, the direct memory access (DMA) controller 114 is configured to allow certain hardware devices to send or receive data directly to or from the main memory, thereby bypassing the processor 104 to speed up memory operations. For example, the DMA controller 114 can allow the homography decomposition module 110 to access the memory 106 without involving the processor 104. In some embodiments, the DMA controller 114 can perform a two-dimensional DMA. The two-dimensional DMA is able to automatically skip over certain bytes in memory that do not correspond to a column of an image.

In some embodiments, the interface 116 can be implemented in hardware to send and receive signals in a variety of mediums, such as optical, copper, and/or wireless interfaces, and in a number of different protocols, some of which may be non-transient.

In some embodiments, one or more of the modules 108, 110, 112 can be implemented in software. The software can run on a processor 104 capable of executing computer instructions or computer code. The processor 104 is implemented in hardware using an application specific integrated circuit (ASIC), programmable logic array (PLA), digital signal processor (DSP), field programmable gate array (FPGA), or any other integrated circuit. The processor 104 suitable for the execution of a computer program include, by way of example, both general and special purpose microprocessors, digital signal processors, and any one or more processors of any kind of digital computer. Generally, the processor 104 receives instructions and data from a read-only memory or a random access memory or both.

The modules 108, 110, 112 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, two or more modules 108, 110, 112 can be implemented on the same integrated circuit, such as ASIC, PLA, DSP, or FPGA, thereby forming a system on chip. Subroutines can refer to portions of the computer program and/or the processor/special circuitry that implement one or more functions.

The computing device 102 can be operatively coupled to an image capture device 118. The image capture device 118 can provide, via the interface 116, one or more images to be rectified. The image capture device 118 can include a charge-coupled device (CCD) image sensor or a complementary metal-oxide-semiconductor (CMOS) image sensor, line-scan sensors, flying spot scanners, electron microscopes, X-ray devices including computed tomography (CT) scanners, magnetic resonance imagers, and/or other devices known to those skilled in the art.

The computing device 102 can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, the computing device 102 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the computing device 102 can include a server. The server can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

In some embodiments, the homography removal module 112 can be configured to rectify a distorted image to recover a rectified image using a two-stage image mapping process. In the first stage of the two-stage image mapping process, the homography removal module 112 can remove a first transformation A from the distorted image to generate an intermediate image by processing pixels along the x-axis of the distorted image, and in the second stage of the two-stage image mapping process, the homography removal module 112 can remove a second transform B by processing pixels along the y-axis of the intermediate image.

In some embodiments, one or more decomposed transformations of homography can be designed so that the homography removal module 112 accesses pixels preferentially along an x-axis of a source image and along an x-axis of a destination image. This is because memory is generally aligned with the x-axis of an image. In other words, memory generally stores an image by (1) storing all pixels having a first y-coordinate while preserving the pixel order along the x-axis, and then (2) storing all pixels having a second y-coordinate (oftentimes adjacent to the first y-coordinate) while preserving the pixel order along the x-axis, until all pixels in the image are stored. Therefore, by designing one or more decomposed transformations to access pixels preferentially along the x-axis of the image, the homography removal module 112 can use direct memory access, e.g., using the direct memory access controller, to reduce cache misses and memory access time.

In some embodiments, the homography removal module 112 can be configured to transpose an intermediate image generated by the first stage of the two-stage image mapping process, prior to initiating the second stage of the two-stage image mapping process. By doing so, although the second stage of the two-stage image mapping process is configured to process pixels along the y-axis of the intermediate image, the homography removal module 112 can still access pixels preferentially along an x-axis of the transposed intermediate image (which is in effect the y-axis of the transposed intermediate image) to align the memory access to the memory structure during the second stage of the two-stage image mapping process.

As discussed above, in some embodiments, the homography decomposition module 110 is configured to decompose the homography into a first transform and a second transform that collectively represent the homography. In some cases, once the homography decomposition module 110 receives the predetermined homography, the homography decomposition module 110 can use a predetermined relationship between the homography, the first transform, and the second transform to determine the decomposition. The following describes this predetermined relationship between the homography, the first transform, and the second transform.

Homography is typically represented using a 3×3 homography matrix H in a homogenous coordinate $(x_h, y_h, z_h)$, where the subscript h indicates that the variable is associated with a homogeneous coordinate. Suppose (x, y) is a coordinate system of the object plane (e.g., a plane associated with a rectified image) and (x', y') is a coordinate system of an image plane (e.g., a plane associated with a distorted image). By definition of homogenous coordinates, it follows that:

$$x = x_h / z_h$$

$$y = y_h / z_h$$

$$x' = x_h' / z_h'$$

$$y' = \frac{y_h'}{z_h'}$$

A general perspective operation can be expressed as follows:

$$\begin{bmatrix} x_h' \\ y_h' \\ z_h' \end{bmatrix} = H \begin{bmatrix} x \\ y \\ 1 \end{bmatrix}$$

Or equivalently by explicitly identifying the coefficients of H:

$$\begin{bmatrix} x_h' \\ y_h' \\ z_h' \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x \\ y \\ 1 \end{bmatrix}$$

Without loss of generality, the homography decomposition module 110 can choose an origin point on the image plane, and define that location to be the origin of the object plane as well. This way, the homography matrix H can be simplified to remove translation:

$$h_{02} = h_{12} = 0$$

Furthermore, as is the case with homogenous coordinate representations, the homography decomposition module 110 can arbitrarily set the overall scale of the homography matrix H. In some embodiments, the homography decomposition module 110 can set the scale of the homography matrix H by setting $h_{22} = 1$.

With these assumptions, the homography matrix H that defines the homography between an object plane and an image plane has six parameters and can be written as:

$$\begin{bmatrix} x_h' \\ y_h' \\ z_h' \end{bmatrix} = \begin{bmatrix} h_{00} & h_{01} & 0 \\ h_{10} & h_{11} & 0 \\ h_{20} & h_{21} & 1 \end{bmatrix} \begin{bmatrix} x \\ y \\ 1 \end{bmatrix}$$

This representation of the homography matrix H allows for rectifying arbitrary amount of rotations.

In some cases, the homography matrix H can be further constrained to improve the quality of the rectified image. To this end, the homography decomposition module 112 can constrain the rotation element of the homography matrix H. The constraint on the rotation element of the homography matrix H, in effect, determines (e.g., fixes) the amount of rotation associated with the homography matrix H.

In some embodiments, the homography decomposition module 112 is configured to constrain the rotation component of the homography matrix H by setting $h_{01} = h_{10}$. Under this constraint, the homography matrix H that defines the homography between an object plane and an image plane has five parameters and can be written as:

$$\begin{bmatrix} x_h' \\ y_h' \\ z_h' \end{bmatrix} = \begin{bmatrix} h_{00} & h_{01} & 0 \\ h_{10} & h_{11} & 0 \\ h_{20} & h_{21} & 1 \end{bmatrix} \begin{bmatrix} x \\ y \\ 1 \end{bmatrix}$$

In some cases, the actual rotation associated with the distorted image can deviate substantially from the amount of rotation associated with the homography matrix H. This may result in undesirable performance degradation. In such cases, the homography decomposition module 112 can instruct the homography removal module 110 to locally down-sample during stage 1 of the multi-stage rectification process and then locally up-sample during stage 2 of the multi-stage rectification process to reduce performance degradation.

In some embodiments, the homography matrix H can be further constrained to include only two degrees of freedom with regards to the tilt. The two degree of freedom with regards to the tilt can be parameterized using: (1) a tilt direction τ (also known as azimuth) and (2) a tilt amount σ

(also known as declination or just tilt). When the tilt constraint is combined with previously described constraints and conventions, this is sufficient to compute the homography matrix H to rectify the tilt specified by σ and τ:

$$\begin{bmatrix} x'_h \\ y'_h \\ z'_h \end{bmatrix} = \begin{bmatrix} (\cos\tau)^2 + (\sin\tau)^2\cos\sigma & \sin\tau\cos\tau(1-\cos\sigma) & 0 \\ \sin\tau\cos\tau(1-\cos\sigma) & (\sin\tau)^2 + (\cos\tau)^2\cos\sigma & 0 \\ \dfrac{-\sin\tau\sin\sigma}{f} & \dfrac{\cos\tau\sin\sigma}{f} & 1 \end{bmatrix} \begin{bmatrix} x \\ y \\ 1 \end{bmatrix}$$

In some embodiments, the homography decomposition module 112 can constrain the rotation component of the homography matrix H through another set of parameterization. This set of parameterization includes three angle parameters that specify (sequentially): (1) a rotation around the z axis, (2) a rotation around the y axis and (3) a rotation around the x axis. This is often called a "roll, pitch, and yaw" representation. There are at least two different ways to parameterize the "roll, pitch, and yaw" representation. In a first example, the pitch and yaw represent rotations around the "new" axis after the previous rotations; and in a second example, each of the roll, pitch, and yaw represents rotation around a non-moving "world" axis. For the purpose of illustration, the proceeding disclosure uses the second example of the "roll, pitch, and yaw" representation, in which the rotation around the world z axis is indicated as γ; the rotation around the world y axis is indicated as β, and the rotation around the x axis is indicated as α. Based on this representation, the homography matrix H can take the following form:

$$\begin{bmatrix} x'_h \\ y'_h \\ z'_h \end{bmatrix} = \begin{bmatrix} \cos\beta\cos\gamma & -\cos\beta\sin\gamma & 0 \\ \sin\alpha\sin\beta\cos\gamma + \cos\alpha\sin\gamma & -\sin\alpha\sin\beta\sin\gamma + \cos\alpha\cos\gamma & 0 \\ \dfrac{-\cos\alpha\sin\beta\cos\gamma + \sin\alpha\sin\gamma}{f} & \dfrac{\cos\alpha\sin\beta\sin\gamma + \sin\alpha\cos\gamma}{f} & 1 \end{bmatrix} \begin{bmatrix} x \\ y \\ 1 \end{bmatrix}$$

In some embodiments, the homography decomposition module 112 can constrain the rotation around the z-axis (γ) in the homography matrix H. By constraining the value of γ to zero, the homography matrix H can be simplified to the following form:

$$\begin{bmatrix} x'_h \\ y'_h \\ z'_h \end{bmatrix} = \begin{bmatrix} \cos\beta & 0 & 0 \\ \sin\alpha\sin\beta & \cos\alpha & 0 \\ \dfrac{-\cos\alpha\sin\beta}{f} & \dfrac{\sin\alpha}{f} & 1 \end{bmatrix} \begin{bmatrix} x \\ y \\ 1 \end{bmatrix}$$

This parameterization has a favorable characteristic that both $h_{01}$ and $h_{10}$ have a small magnitude.

The remainder of the present disclosure provides embodiments based on the following representation of the homography matrix H:

$$\begin{bmatrix} x'_h \\ y'_h \\ z'_h \end{bmatrix} = \begin{bmatrix} h_{00} & h_{01} & 0 \\ h_{10} & h_{11} & 0 \\ h_{20} & h_{21} & 1 \end{bmatrix} \begin{bmatrix} x \\ y \\ 1 \end{bmatrix}$$

However, one of ordinary skill in the art can adapt the disclosed embodiments to use other homography matrix representations.

Given the homography matrix H, the goal of homography rectification is to remove this homography H from the distorted image on the image plane $(x'_n, y'_n, z'_n)$.

In some embodiments, the homography decomposition module 112 is configured to decompose the homography matrix H into a first transform A and a second transform B such that $$H = A * B$$

where * indicates a concatenation operator. This relationship can be written out as follows:

$$H = \begin{bmatrix} a_{00} & a_{01} & 0 \\ a_{10} & a_{11} & 0 \\ a_{20} & a_{21} & 1 \end{bmatrix} * \begin{bmatrix} b_{00} & b_{01} & 0 \\ b_{10} & b_{11} & 0 \\ b_{20} & b_{21} & 1 \end{bmatrix}$$

Figure 2:
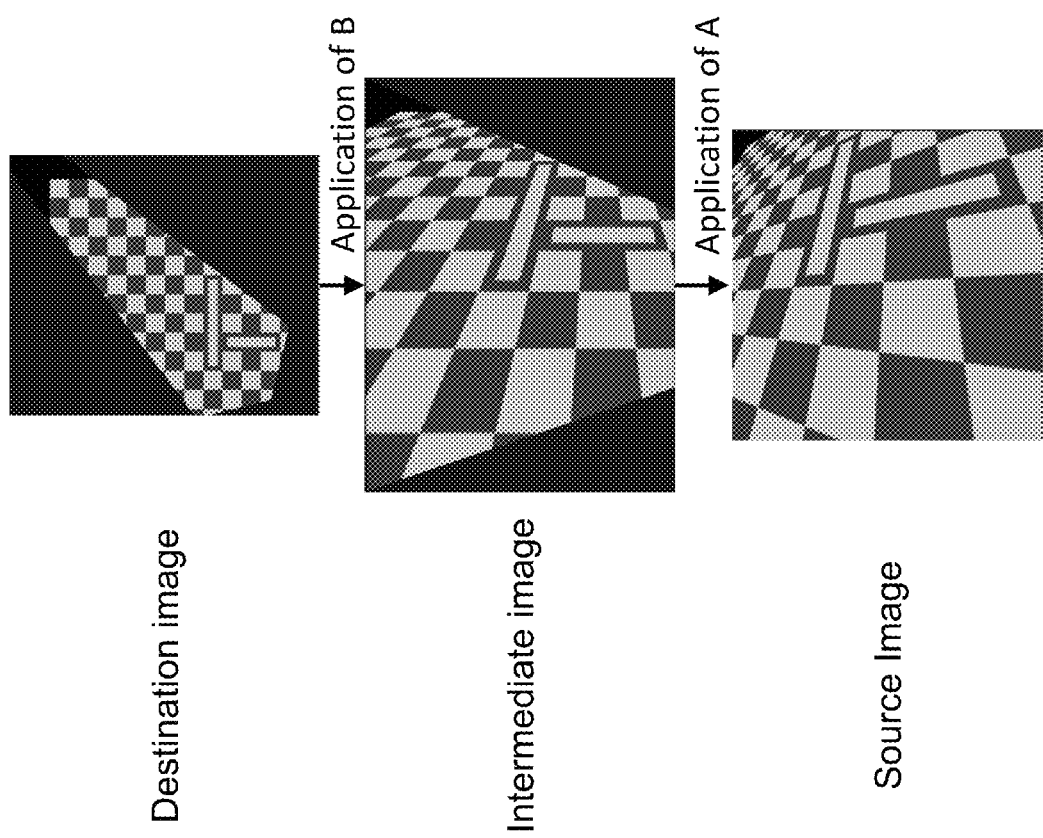
FIG. 2 illustrates an application of a second transform B to distort a rectified image into an intermediate image, and an application of a first transform A to distort the intermediate image into the distorted image, in accordance with some embodiments.

In some sense, the first transform A relates the distorted image, on an image plane represented by the coordinate system (x', y'), to an intermediate image, on an intermediate image plane represented by the coordinate system $(x^I, y^I)$, and the second transform B relates the intermediate image, on the intermediate image plane represented by the coordinate system $(x^I, y^I)$, to a rectified image, on an object plane represented by the coordinate system (x, y). FIG. 2 illustrates an application of the second transform B to distort a rectified image (e.g., an orthographic view of the object plane, which is the desired outcome of the two-stage rectification process) into an intermediate image, and an application of the first transform A to distort the intermediate image into the distorted image (e.g., input image to the two-stage rectification process).

Since the first transform A relates the distorted image with an intermediate image and the second transform B relates the intermediate image with a rectified image, the homography H can be removed from the distorted image to recover the rectified image by (1) removing the first transform A from the distorted image to generate an intermediate image and (2) removing the second transform B from the intermediate image to generate the rectified image.

In some embodiments, the second transform B can be represented as a concatenation of three operations: a transpose operation T that flips the x and y coordinates while leaving the z coordinate intact, the transposed second transform $B_{yx}$, and another transpose operation T:

$$B = T * B_{yx} * T$$

where the transpose operation T can be represented as follows:

$$T = \begin{bmatrix} 0 & 1 & 0 \\ 1 & 0 & 0 \\ 0 & 0 & 1 \end{bmatrix}$$

Therefore, the homography matrix H can be represented as follows:

$$H = A * T * B_{yx} * T$$

where $$B_{yx} = \begin{bmatrix} b_{11} & b_{10} & 0 \\ b_{01} & b_{00} & 0 \\ b_{21} & b_{20} & 1 \end{bmatrix}.$$

The subscript "yx" is used to indicate that the transposed second transform $B_{yx}$ operates on a flipped x-y coordinates.

Note that the transposed second transform $B_{yx}$ is not merely a transpose of the second transform $$B\left(\text{e.g.,}\begin{bmatrix}b_{00} & b_{01} & 0\\ b_{10} & b_{11} & 0\\ b_{20} & b_{21} & 1\end{bmatrix}\right).$$

The transposed second transform $B_{yx}$ can be derived from the second transform B by rearranging the terms in B based on the fact that the x and y coordinates are swapped with the z coordinate remaining the same.

In some embodiments, the first transform A and the second transform B can be constrained to have properties discussed above: that (1) pixels in a particular row of a source image are mapped to equi-distance pixels (e.g., each pair of adjacent pixels are separated by an equal distance) in a fixed row of a destination image, hereinafter referred to as a first constraint, and that (2) a row of a source image is mapped to a row of a destination image, hereinafter referred to as a second constraint.

The first constraint can be introduced into the first transform A by constraining $$\frac{dx'}{dx^I},$$

which indicates the rate of change of x' (the x-coordinate of the image plane) with respect to $x^I$ (the x-coordinate in the intermediate image plane). The x' can be represented directly using the parameters of the first transform A:

$$x' = \frac{x'_h}{z'_h} = \frac{a_{00}x^I + a_{01}y^I}{a_{20}x^I + a_{21}y^I + 1}$$

Therefore, using the chain rule of differentiation, the derivative of x' with respect to $x^I$ can be represented as follows:

$$\frac{dx'}{dx^I} = \frac{a_{00}(a_{20}x^I + a_{21}y^I + 1) - (a_{00}x^I + a_{01}y^I)(a_{20})}{(a_{20}x^I + a_{21}y^I + 1)^2}$$

$$\frac{dx'}{dx^I} = \frac{a_{00} + a_{00}a_{21}y^I - a_{01}a_{20}y^I}{(a_{20}x^I + a_{21}y^I + 1)^2}$$

If this derivative $$\frac{dx'}{dx^I}$$

depends only on $y^I$, then the distance between adjacent pixels in the intermediate image will be identical for all adjacent pixels. The derivative $$\frac{dx'}{dx^I}$$

can be made to depend only on $y^I$. The only term that depends on $x^I$ is found in the denominator. Therefore, in order to remove the dependency on $x^I$, the multiplier $a_{20}$ can be set to zero.

The second constraint can be introduced into the first transform A by introducing a constraint that the y-coordinate of the distorted image must depend only on the y-coordinate of the intermediate image. By setting $a_{20}=0$ as above, the denominator $z_h'$ is already known to depend only on $y^I$. Therefore, if the numerator $y_h'$ depends only on $y^I$, then the y' (e.g., the y-coordinate of the distorted image) would depend only on the y-coordinate of the intermediate image, thereby mapping the row of the intermediate image to a row of a distorted image.

By applying the first transform A to the intermediate image coordinates, the y-coordinate of the distorted image can be expressed as follows:

$$y_h' = a_{10}x^I + a_{11}y^I$$

Therefore, in order for the y-coordinate of the distorted image to depend only on y, the coefficient for $x^I$ can be set to zero: $a_{10}=0$.

Therefore, in summary, the first constraint and the second constraint require that the first transform A takes the following form:

$$A = \begin{bmatrix} a_{00} & a_{01} & 0\\ 0 & a_{11} & 0\\ 0 & a_{21} & 1 \end{bmatrix}$$

In some embodiments, the first constraint and the second constraint should be imposed on the second transform B as well. Since the transposed second transform $$B_{yx} = \begin{bmatrix} b_{11} & b_{10} & 0\\ b_{01} & b_{00} & 0\\ b_{21} & b_{20} & 1 \end{bmatrix}$$

is operating under the same condition as A, $B_{yx}$ should have the same form as A. Therefore, $b_{21}=0$ per the first constraint and $b_{01}=0$ per the second constraint. Therefore, $B_{yx}$ can be represented as follows:

$$B_{yx} = \begin{bmatrix} b_{11} & b_{10} & 0\\ 0 & b_{00} & 0\\ 0 & b_{20} & 1 \end{bmatrix}$$

The transpose second transform $B_{yx}$ can be related back to the second transform B as follows:

$$B = \begin{bmatrix} b_{00} & 0 & 0\\ b_{10} & b_{11} & 0\\ b_{20} & 0 & 1 \end{bmatrix}$$

In summary, the homography matrix H can be represented as follows:

$$\begin{bmatrix} h_{00} & h_{01} & 0\\ h_{01} & h_{11} & 0\\ h_{20} & h_{21} & 1 \end{bmatrix} = \begin{bmatrix} a_{00} & a_{01} & 0\\ 0 & a_{11} & 0\\ 0 & a_{21} & 1 \end{bmatrix} * \begin{bmatrix} b_{00} & 0 & 0\\ b_{10} & b_{11} & 0\\ b_{20} & 0 & 1 \end{bmatrix}$$

Alternatively, the homography matrix H can also be represented as follows:

$$\begin{bmatrix} h_{00} & h_{01} & 0 \\ h_{01} & h_{11} & 0 \\ h_{20} & h_{21} & 1 \end{bmatrix} = \begin{bmatrix} a_{00} & a_{01} & 0 \\ 0 & a_{11} & 0 \\ 0 & a_{21} & 1 \end{bmatrix} * T * \begin{bmatrix} b_{11} & b_{10} & 0 \\ 0 & b_{00} & 0 \\ 0 & b_{20} & 1 \end{bmatrix} * T$$

The decomposition of the homography matrix H can be used to analytically solve for a relationship between the coefficients of H, the coefficients of A, and the coefficients of B. Based on this analytic calculation, it can be shown that the first transform A and the transposed second transform $B_{yx}$ are related to the coefficients of H as follows:

$$A = \begin{bmatrix} 1 & h_{01} & 0 \\ 0 & h_{11} & 0 \\ 0 & h_{21} & 1 \end{bmatrix}$$

$$B_{yx} = \begin{bmatrix} 1 & \frac{h_{01}}{h_{11}} & 0 \\ 0 & h_{00} - \frac{h_{01}^2}{h_{11}} & 0 \\ 0 & h_{20} - \frac{h_{21}h_{01}}{h_{11}} & 1 \end{bmatrix}$$

Therefore, once the homography decomposition module 110 receives the coefficients of the homography matrix H, the homography decomposition module 110 can generate the first transform A and the transposed second transform $B_{yx}$ using the above relationship.

In some embodiments, the first transform A and/or the second transform B can include a scaling factor that effectively down-samples the destination image when recovering the source image. The following decomposition adheres to the first constraint and the second constraint, as described above, while allowing for down-sampling by a down-sampling rate in the first transform A:

$$\begin{bmatrix} h_{00} & h_{01} & 0 \\ h_{01} & h_{11} & 0 \\ h_{20} & h_{21} & 1 \end{bmatrix} = \begin{bmatrix} s_{Ax} & s_{Ay}h_{01} & 0 \\ 0 & s_{Ay}h_{11} & 0 \\ 0 & s_{Ay}h_{21} & 1 \end{bmatrix} * \begin{bmatrix} \frac{1}{s_{Ax}}\left(h_{00} - \frac{h_{01}^2}{h_{11}}\right) & 0 & 0 \\ \frac{1}{s_{Ay}}\left(\frac{h_{01}}{h_{11}}\right) & \frac{1}{s_{Ay}} & 0 \\ h_{20} - \frac{h_{21}h_{01}}{h_{11}} & 0 & 1 \end{bmatrix}$$

where $s_{Ax}$ and $s_{Ay}$ refer to sampling factors in the x dimension and the y dimension, respectively. Alternatively, the homography matrix H can be represented as follows:

$$\begin{bmatrix} h_{00} & h_{01} & 0 \\ h_{01} & h_{11} & 0 \\ h_{20} & h_{21} & 1 \end{bmatrix} = \begin{bmatrix} s_{Ax} & s_{Ay}h_{01} & 0 \\ 0 & s_{Ay}h_{11} & 0 \\ 0 & s_{Ay}h_{21} & 1 \end{bmatrix} * T * \begin{bmatrix} \frac{1}{s_{Ay}} & \frac{1}{s_{Ay}}\left(\frac{h_{01}}{h_{11}}\right) & 0 \\ 0 & \frac{1}{s_{Ax}}\left(h_{00} - \frac{h_{01}^2}{h_{11}}\right) & 0 \\ 0 & h_{20} - \frac{h_{21}h_{01}}{h_{11}} & 1 \end{bmatrix} * T$$

In some embodiments, the sampling factors $s_{Ax}$ and/or $s_{Ay}$ may be less than 1 to effectively oversample the distorted image in the first stage. This way, the information in the distorted image can be preserved for processing in the second stage.

In some embodiments, the homography removal module 112 can efficiently remove the first transform A and the transposed second transform $B_{yx}$ from the distorted image. The job of the homography removal module 112 in each stage of the two-stage rectification process is to remove a limited homography (e.g., a first transform A or a transposed second transform $B_{yx}$) with only four non-trivial coefficients:

$$A = \begin{bmatrix} s_{Ax} & s_{Ay}h_{01} & 0 \\ 0 & s_{Ay}h_{11} & 0 \\ 0 & s_{Ay}h_{21} & 1 \end{bmatrix}, \text{ or } B_{yx} = \begin{bmatrix} \frac{1}{s_{Ay}} & \frac{1}{s_{Ay}}\left(\frac{h_{01}}{h_{11}}\right) & 0 \\ 0 & \frac{1}{s_{Ax}}\left(h_{00} - \frac{h_{01}^2}{h_{11}}\right) & 0 \\ 0 & h_{20} - \frac{h_{21}h_{01}}{h_{11}} & 1 \end{bmatrix}$$

Because the first transform A and the transposed second transform $B_{yx}$ have the same structure, the homography removal module 112 can, in effect, perform the same procedure twice, once for the first transform A and once for the transposed second transform $B_{yx}$. Therefore, the first stage and the second stage of the two-stage rectification process can comprise substantially identical operations.

Figure 3:
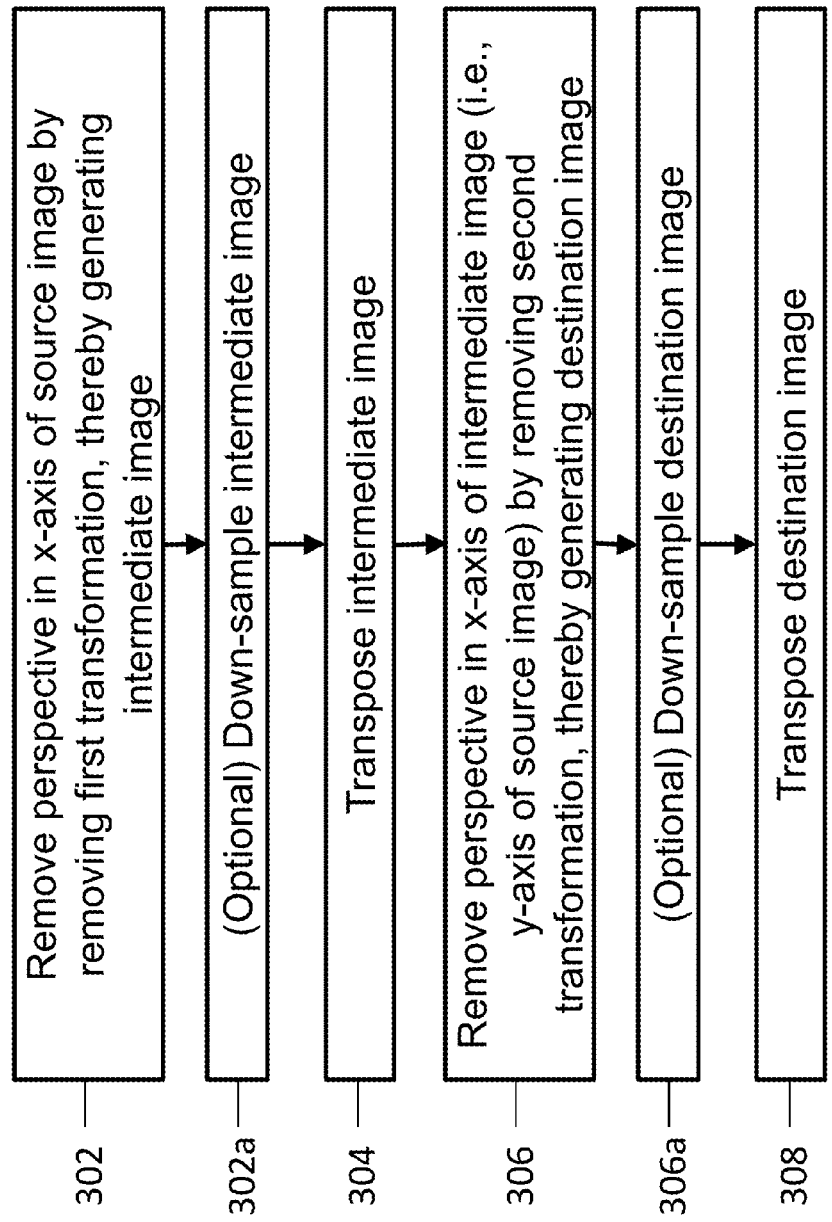
FIG. 3 illustrates a two-stage image mapping process in accordance with some embodiments.

FIG. 3 illustrates a two-stage image mapping process in accordance with some embodiments. The two-stage image mapping process uses the decomposition of the homography, as determined by the homography decomposition module 110, to perform rectification in two stages. In the first stage of the two-stage image mapping process (identified as steps 302-304), the homography removal module 112 can process pixels of the distorted image along the x-axis, and in the second stage of the two-stage image mapping process (identified as steps 306-308), the homography removal module 112 can process pixels of the intermediate image along the y-axis. It is worth noting that, thanks to the transpose operation that occurs between the first stage and the second stage, the first stage of the multi-stage rectification process is substantially similar to the second stage of the multi-stage rectification process.

Figure 4:
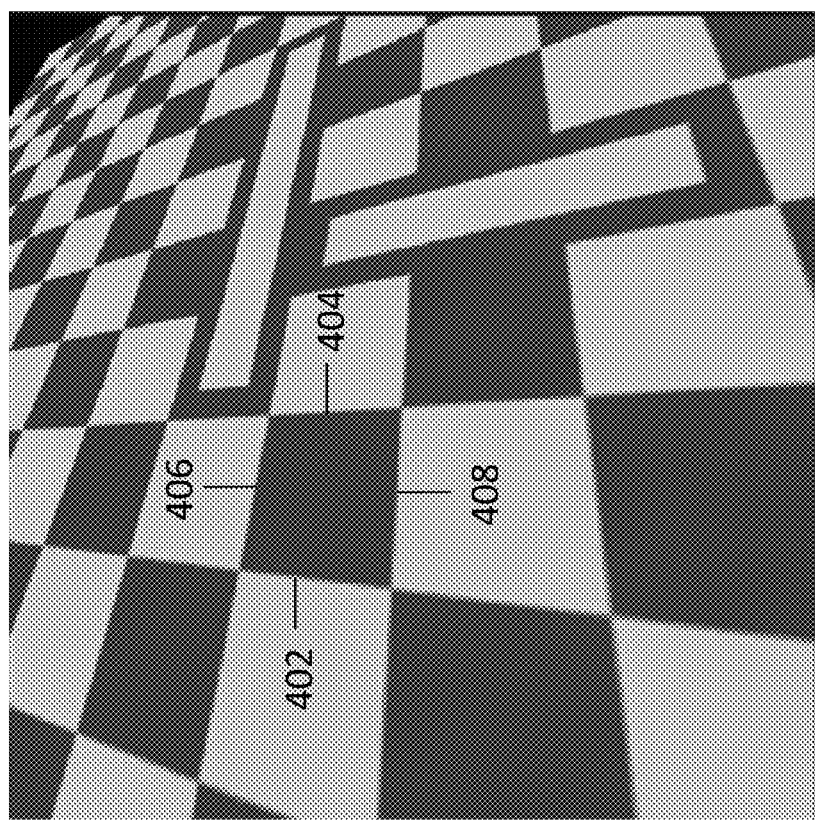
FIG. 4 illustrates an example of a distorted image that has been subject to perspective distortion in accordance with some embodiments.

Prior to initiating the steps in FIG. 3, the homography removal module 112 can be configured to receive the distorted image, and the homography represented as a concatenation of a first transform A and a second transform B (or a transposed second transform). The homography removal module 112 can receive the homography representation from the homography decomposition module 110. FIG. 4 illustrates an example of a distorted image that has been subject to perspective distortion. The perspective distortion manifests itself by transforming two vertical, parallel lines 402, 404 into two non-parallel lines and two horizontal, parallel lines 406, 408 into two non-parallel lines.

In step 302, the homography removal module 112 is configured to remove the first transformation from the distorted image by processing distorted image along the x-axis, thereby generating the intermediate image. In step 302a, the homography removal module 112 can optionally down-sample the intermediate image. In some embodiments, the step 302 and the step 302a can be performed simultaneously. For example, the first transform A can incorporate the down-sampling factor, as discussed above, so that by removing the first transform A from the distorted image, the homography removal module 112 can in effect also perform the down-sampling operation.

In step 302, the homography removal module 112 can be configured to determine, for each pixel of an intermediate image, a corresponding location in the distorted image. For example, the homography removal module 112 can access one of the pixels in a row of an intermediate image, and determine which location within the distorted image corresponds to the one of the pixels in the intermediate image using the first transform A. In some cases, this location within the distorted image can have a sub-pixel coordinate value. For example, the location within the distorted image can have a coordinate of (2.24, 3.1).

Because the first transform A is subject to the first and second constraints, the homography removal module 112 knows in advance that a pixel in a row of the intermediate image always corresponds to a location in a predetermined y-coordinate of the distorted image. Therefore, the pattern in which the homography removal module 112 should access the distorted image in memory 106 is predictable and deterministic. Thus, the homography removal module 112 can use a standard ping-pong two-buffer system and the DMA controller 114 to read and store a row or groups of rows of an image in parallel.

Once the homography removal module 112 determines the correspondence between a pixel in an intermediate image and a location in a distorted image, the homography removal module 112 can determine the image value for that pixel in the intermediate image. To determine the image value for that pixel, the homography removal module 112 can use the image value at the corresponding location in the distorted image.

When the corresponding location falls on a pixel grid of the distorted image, the homography removal module 112 can filter the image values surrounding the corresponding location in the distorted image. In some cases, the homography removal module 112 may simply copy the image value of the corresponding location in the distorted image. When the corresponding location does not fall on the grid of the distorted image, the homography removal module 112 can determine the image value of the pixel in the intermediate image by interpolating image values of pixels surrounding the corresponding location in the distorted image.

For example, the homography removal module 112 can convolve pixels surrounding the corresponding location in the distorted image with a kernel to interpolate image values of pixels surrounding the corresponding location in the distorted image. In some cases, the kernel can also be designed to perform appropriate smoothing (e.g., to satisfy the Nyquist sampling constraint) along a row of the distorted image. In some embodiments, the kernel can be a truncated sync function; in other embodiments, the kernel can be a truncated Gaussian function.

In some embodiments, the homography removal module 112 can predetermine a set of kernels to be used for pre-selected sub-pixel variations from the grid locations. When the corresponding location in the distorted image is off from the grid in the x-axis by 0.1 pixel, then the homography removal module 112 can use a first one of the predetermined set of kernels; when the corresponding location in the distorted image is off from the grid in the x-axis by 0.3 pixel, then the homography removal module 112 can use a second one of the predetermined set of kernels, etc. In some embodiments, each kernel in the set of kernels has the same functional form.

For example, the set of kernels can include the following:

| | |
|---|---|
| K1: | 36, 56, 36, 0 |
| K2: | 30, 56, 38, 4 |
| K3: | 25, 54, 41, 8 |
| K4: | 21, 50, 45, 12 |
| K5: | 16, 48, 48, 16 |
| K6: | 12, 45, 50, 21 |
| K7: | 8, 41, 54, 25 |
| K8: | 4, 38, 56, 30 |

These kernels K1-K8 all have the same functional form, but each kernel is associated with a different sub-pixel coordinate (also referred to as a sub-pixel phase.)

When the homography removal module 112 is to filter a location that is on a pixel grid (e.g., 0 sub-pixel phase), then the homography removal module 112 can use K1 to filter pixels around the location. Note that K1 is symmetric around the center. When the homography removal module 112 is to filter a location that is separated from the pixel grid by ⅛ sub-pixel phase, then the homography removal module 112 can use K2 to filter pixels around the location. For example, the homography removal module 112 can directly multiply K2 to a sequence of four image pixels in order to simultaneously perform sub-pixel interpolation and filtering. When the homography removal module 112 is to filter a location that is separated from the pixel grid by ½ sub-pixel phase, then the homography removal module 112 can use K5 to filter pixels around the location. Because an offset of a ½ sub-pixel phase refers to identifying an image value at the exact boundary of two adjacent pixels, K5 is symmetric. Note that K2 and K8, which correspond to a sub-pixel phase of ⅛ and ⅞, respectively, have the same values but are mirrors of each other. This makes sense because ⅛ is the same as −⅞ and −⅛ is the same as ⅞. The same is true for the pairs "¼, ¾", and "⅜, ⅝".

In some embodiments, when a location on the distorted image does not have a sub-pixel phase that exactly matches the sub-pixel phase of one of the kernels in the set, then the homography removal module 112 can use a kernel associated with a sub-pixel phase that is closest to that of the location. For example, when the sub-pixel phase of the location is ⅑, the homography removal module 112 can use K1 to filter that location since ⅑ is closer to ⅛ than any other sub-pixel phases associated with the kernels.

In some embodiments, the homography removal module 112 can perform the convolution operation using a single-instruction-multiple-data (SIMD) processing unit. In particular, the convolution operation can be easily performed using a SIMD multiply and/or a SIMD dot-product instruction operable by a SIMD processing unit.

In some embodiments, the convolution operation can involve a two-dimensional kernel. When the kernel is separable in the spatial axes (e.g., x and y axes), the homography removal module 112 can perform the convolution in two separate steps: (1) convolve along the x-axis (e.g., a row of an image), and (2) convolve along the y-axis (e.g., a column of an image).

With respect to the first step, because the first transform A is subject to the first constraint, pixels on a row of an intermediate image are mapped to locations that are equidistant from adjacent locations within a fixed y-coordinate of the distorted image. Therefore, the homography removal module 112 can apply a single kernel function to all corresponding locations within a fixed y-coordinate of the distorted image. Because the sub-pixel phase of locations within the distorted image may differ from one another, the homography removal module 112 can select, based on the sub-pixel phase of each location, one of the kernels in a set corresponding to that single kernel function. This can avoid the homography removal module 112 needing to generate the kernel during convolution along the fixed row of the distorted image. In some embodiments, the homography removal module 112 can use the same kernel function for different rows; in other embodiments, the homography removal module 112 can use different kernel functions for different rows. The result of the convolution operation along the x-axis (also referred to as an x-convolution result) can be stored in a temporary buffer.

When the homography removal module 112 completes the convolution along the x-axis, the homography removal module 112 can perform the convolution along the y-axis by convolving a y-directional kernel on the x-convolution result stored in the temporal buffer. In some embodiments, the temporal buffer can maintain a predetermined number of rows associated with the x-convolution result. This predetermined number of rows can be determined based on a size of the y-directional kernel. For example, when a y-directional kernel has a length of 5 pixels, the temporal buffer can maintain 5 rows associated with the x-convolution result.

In some embodiments, the temporal buffer can be a rolling buffer (e.g., a circular buffer) that stores a row of the x-convolution result until it is no longer needed to compute the y-convolution. For example, when the homography removal module 112 computes a y-convolution at a pixel having a y-coordinate of j and the y-directional kernel has five pixels, then the homography removal module 112 can store, in the temporal buffer, five rows of the x-convolution result, identified by y-coordinates: j+2, j+1, j, j−1, j−2. When the homography removal module 112 completes the y-convolution of all pixels having the y-coordinate of j, the homography removal module 112 can increase the target y-coordinate by one pixel and computes the y-convolution of all pixels having the y-coordinate of j+1. In this case, the homography removal module 112 can use five rows of the x-convolution result, identified by y-coordinates: j+3, j+2, j+1, j, j−1. Therefore, the temporal buffer no longer needs the row of the x-convolution result having the y-coordinate of j−2. In this case, the temporal buffer removes the row of the x-convolution result having the y-coordinate of j−2 and replaces it with the row of the x-convolution result having the y-coordinate of j+3.

In some embodiments, the y-directional kernel can be identical for each pixel along the row of the output image. Therefore, this y-directional convolution can be implemented by multiplying every pixel of the x-convolved row by the kernel coefficient corresponding to that row, and then summing along columns. This operation can be efficiently implemented using a SIMD processing unit, for example, a SIMD multiply and/or SIMD add instructions.

The constraints on the first transform A do not guarantee any special characteristics about the pixel sampling along the y-axis. Therefore, each row has its own kernel function that can be computed, for example, by (1) mapping a symmetric kernel function in the object plane to a corresponding not-necessarily-symmetric kernel function in the image plane, and (2) integrating it into pixel bins. Such a kernel inherently allows correct sampling at non-integer positions in the y-axis, and also allows the sampling distance between any two rows to be different without loss of performance. Optionally, all the kernel functions used for convolution along the y-axis can be precomputed during a training phase.

Figure 5:
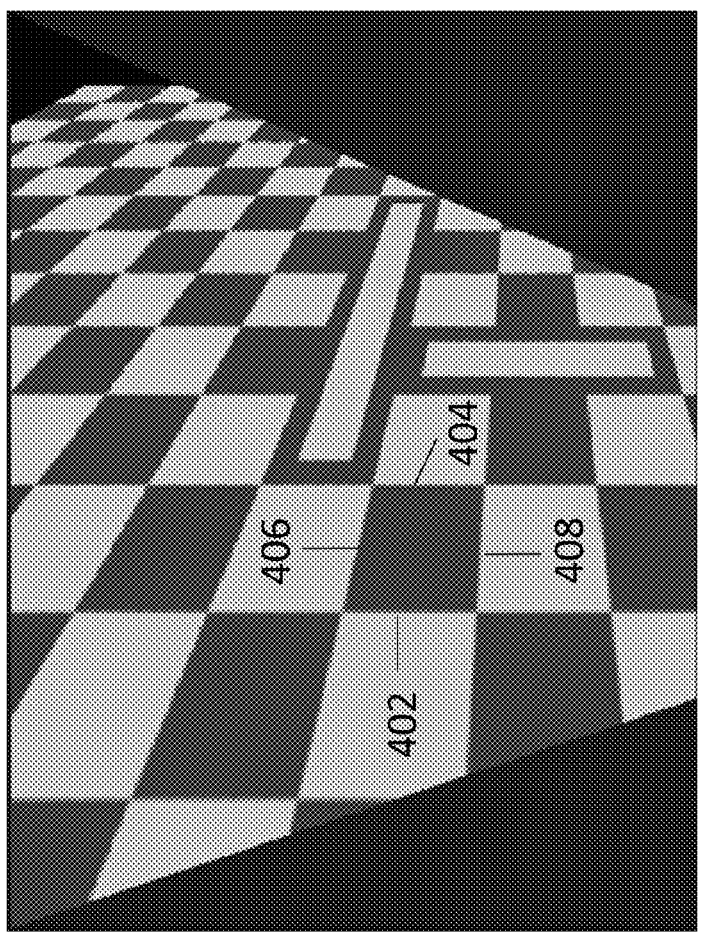
FIG. 5 illustrates an example of an intermediate image generated by removing the first transform A from the distorted image of FIG. 4 in accordance with some embodiments.

FIG. 5 illustrates an example of an intermediate image generated by removing the first transform A from the distorted image of FIG. 4 in accordance with some embodiments. Note that the two vertical, parallel lines 402, 404 are now parallel in the intermediate image. However, the first stage has not removed the distortion of the two horizontal parallel lines 406 and 408.

As shown in FIG. 5, the intermediate image can have a skewed trapezoid shape (e.g., two sides are parallel; the other two sides may not be). In some cases, the relevant start points and run lengths in each row in the distorted image, x-convolved row, and each row in the intermediate image can optionally be precomputed in a training step.

To remove the distortion of the two horizontal parallel lines 406 and 408, the homography removal module 112 can move onto the second stage of the two-stage image mapping process. However, as discussed above, prior to initiating the second stage, in step 304, the homography removal module 112 is configured to transpose the intermediate image.

In some embodiments, the homography removal module 112 can perform the transpose operation using a "vertical" buffer. For example, output values of the y-directional convolution (e.g., the intermediate image) can be stored as a temporary image of a fixed width, preferably that fits into near-to-chip memory (e.g. user-controlled Level-2 cache). These output values are written to the buffer in a column order, instead of a row order, and hence the name vertical buffer. Because the buffer can be entirely contained in near-to-chip memory, the homography removal module 112 need not store or access any external memory devices, which improves the memory access time. In effect, this embodiment performs the transpose operation in a local manner.

In some embodiments, the homography removal module 112 can alternate writing to one of two vertical buffers in a "ping-ping" fashion so that the previous column, written to a first vertical buffer, can be written out to external memory while the current column is being written to a second vertical buffer.

In some embodiments, the vertical buffer data can be transferred to a region in external memory using a DMA controller 114. The region in the external memory can be large enough to accommodate the full rectified image.

In some embodiments, the DMA controller 114 can transfer the vertical buffer data to external memory using two-dimensional DMA. The two-dimensional DMA is able to automatically skip over bytes in external memory that do not correspond to a vertical section of the image, which conceptually matches the data in the vertical buffer. Unlike the local vertical buffer, the external memory does not store adjacent sections (e.g., tiles) of the result image in consecutive memory locations, which may deteriorate the read and/or write speed. In such cases, the two-dimensional DMA can handle the read/write operation efficiently at a minimal additional cost (as long as the width of the local vertical buffer is sufficiently large).

In step 306, once the intermediate image is transposed, the homography removal module 112 is configured to remove the second transformation from the intermediate image by processing pixels in the x-axis of the transposed intermediate image (e.g., the y-axis of the intermediate image). Subsequently, in step 306*a*, the homography removal module 112 is optionally configured to down-sample the result of step 306, and in step 308, the homography removal module 112 is configured to transpose the result of step 306 (or the result of step 306*a* if that is performed). In some embodiments, in steps 306/306*a*, the homography removal module 112 can use similar operations as steps 302/302*a*, and in step 308, the homography removal module 112 can use a similar process as step 304.

Figure 6:
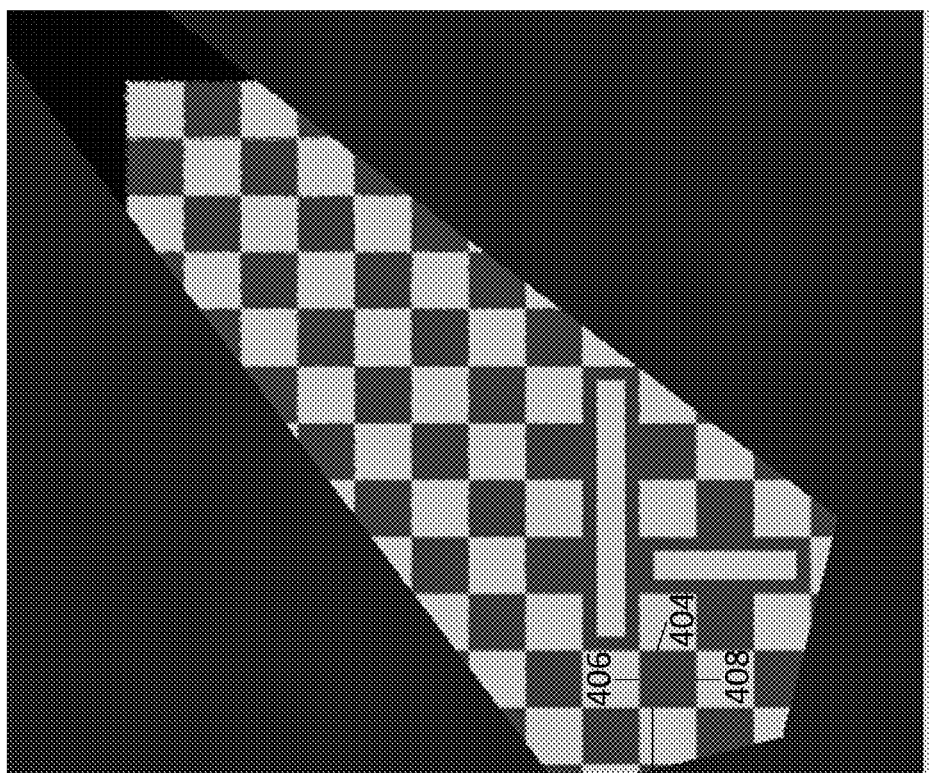
FIG. 6 illustrates an example of a rectified image generated by removing the second transform B from the intermediate image of FIG. 5 in accordance with some embodiments.

FIG. 6 illustrates an example of a rectified image generated by removing the second transform B from the intermediate image of FIG. 5 in accordance with some embodiments. Note that the two horizontal, parallel lines 406, 408, as well as the two vertical, parallel lines 402, 404 are parallel in the rectified image. Therefore, the resulting rectified image has all perspective distortion rectified, and is down-sampled by the target down-sampling rate.

As discussed above, the homography removal module 112 can down-sample the distorted image during homography rectification, and the homography removal module 112 can perform the down sampling in one or more of the two-stages of the multi-stage rectification process. In some embodiments, when there is a target down-sampling rate, it can be advantageous to down-sample as much as possible in step 302*a* (e.g., in the first stage), as this can accelerate the first stage and further accelerate the second stage of the multi-stage rectification process. In each stage of the multi-stage rectification process, the image can be down-sampled independently in x or y direction.

In some embodiments, the rectified image can be provided to a pattern detection system so that the pattern detection system can determine whether the rectified image includes a particular pattern. Because pattern detection systems generally operate more efficiently when the source image does not include non-linear distortion, the disclosed homography rectification process can improve the efficiency of pattern matching. In some cases, the pattern detection system can use a simple correlation-based pattern matching technique to determine whether the rectified image includes a particular pattern. In other cases, the pattern detection system can use embodiments of pattern detection techniques disclosed in U.S. Pat. No. 7,016,539, entitled "Method for fast, robust, multi-dimensional pattern recognition," issued on Mar. 21, 2006, which is herein incorporated by reference in its entirety.

In some embodiments, when the homography is not known in advance, the distorted image can be rectified using one of a plurality of hypothesized homography transforms, and the rectified image can be provided to a pattern detection system to determine if a particular pattern exists under the one of a plurality of hypothesized homography transforms. This process can be iterated for other hypothesized homography transforms until the pattern detection system detects the particular pattern from the rectified image.

In some embodiments, the disclosed multi-stage rectification process can be used to merely perform affine image sampling, without actually removing a general homographic perspective distortions. For example, to limit the homography matrix H to an affine transformation, the parameters $h_{20}$ and $h_{21}$ can be set to zero. In other embodiments, the disclosed multi-stage rectification process can be used to merely remove image scaling. For example, the disclosed multi-stage rectification process can be configured to remove image scaling operations by setting the parameters $h_{10}$ and $h_{01}$ of the homography matrix H to zero, in addition to $h_{20}$ and $h_{21}$.

Even when the disclosed multi-stage rectification process is used to merely remove affine transformation or image scaling operations, the disclosed multi-stage rectification process can be computationally faster than the prior known methods for removing affine transformation or image scaling operation. The computational benefit is derived from the way a kernel is applied to a row of an image. As discussed above, the homography removal module 112 is configured to apply a single kernel function to a row of an image. The homography removal module 112 can maintain a set of kernels that corresponds to this kernel function, where each kernel in the set corresponds to a particular sub-pixel phase. This way, when the homography removal module 112 applies the single kernel function to a row of an image, at each location in the row, the homography removal module 112 can select one of these kernels based on a sub-pixel phase of the location. Because the set of kernels corresponding to sub-pixel phases are already pre-determined, the homography removal module 112 can remove affine transformation or image scaling by applying a selected one of these kernels. When the sub-pixel phase of a location does not exactly correspond to one of the kernels in the set, the homography removal module 112 can select a kernel that is associated with a sub-pixel phase closest to that of the location. This removes nearly all interpolation operations, which tend to be computationally expensive.

In case the homography removal module 112 is configured to remove image scaling only, the homography removal module 112 can further improve the accuracy by maintaining a large number of kernels, each kernel adapted to a finer sub-pixel variation (e.g., sub-pixel phases) from a pixel grid. When the homography removal module 112 performs the down-sampling, the homography removal module 112 can determine, for each pixel of a rectified image, the sub-pixel phase of the corresponding location in the distorted image, and use the sub-pixel variation to select one of the predetermined set of kernels. Subsequently, the homography removal module 112 can apply the selected kernel for the corresponding pixel in the distorted image to remove the image scaling.

In some embodiments, when the homography removal module 112 is configured to remove image scaling only, the homography removal module 112 can perform the operation by only using the first stage of the multi-stage rectification process.

In some embodiments, when the homography transform H between a rectified image and a distorted image satisfies the first and second constraints described above, the homography removal module 112 may use only one of the stages in the multi-stage rectification process to remove the perspective distortion from the distorted image. For example, a distorted image may be subject to a perspective distortion that results from a rotation of an image sensor around an x-axis of the image sensor (e.g., a row of image sensor bit-cells). In this case, an image sensor may be positioned such that the top of the object plane is tilted away from the image sensor as if the image sensor is rotated around an axis that is parallel to one of image sensor axes. This relationship between the image sensor plane and the object plane may be represented by a homography transform H that actually satisfies the first and second constraints: that (1) pixels in a particular row of a rectified image are mapped to equidistance pixels in a fixed row of a distorted image and that (2) a row of the rectified image is mapped to a row of the distorted image. Therefore, in this case, the homography removal module 112 can be configured to perform the rectification operation by only using one of the stages of the multi-stage rectification process.

In some embodiments, the multi-stage rectification process can be used to align images captured by multiple cameras. In some cases, a machine vision system can include a plurality of cameras viewing different parts of the scene, but are roughly aligned. In other words, each of the plurality of cameras is designed to have an identical in-plane rotation and distance from plane. However, due to physical limitations, there may be "small" differences in the in-plane rotation and distance from plane, which manifest themselves as in-plane rotation and scale, respectively. Furthermore, the pixel grid from each camera may be displaced from one another by a sub-pixel value because, due to physical limitations, it is difficult to align the pixels from each camera exactly.

The differences in the images captured by the multiple cameras can be calibrated offline. Therefore, the relationship between images captured by the multiple cameras can be determined offline. This relationship can be represented as a homography matrix. Therefore, the disclosed multi-stage rectification process can be used to align images captured by multiple cameras. In some cases, the disclosed multi-stage rectification process can also be used to down-sample the captured images so that, if one or more cameras have different number of pixels or different pixel sizes, the disclosed multi-stage rectification process can down-sample the images to account for such differences.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A machine vision system comprising:
a processor configured to run a computer program stored in memory that is configured to cause the processor to:
receive a first image and a first transform associated with the first image, wherein the first transform relates the first image to a second image, and is constrained to map a plurality of pixels along a dimension of the second image to a plurality of locations along a dimension of the first image;
determine, for a first pixel of the plurality of pixels, a coordinate of a corresponding first location in the first image;
select one of a plurality of kernels based on a sub-pixel phase associated with the coordinate of the first location, wherein the sub-pixel phase is indicative of a sub-pixel offset of the first location from a pixel grid of the first image; and
generate the second image from the first image by, in part, applying the selected kernel on at least one pixel around the first location in the first image to determine an image value for the first pixel in the second image.

2. The machine vision system of claim 1, wherein the processor is configured to determine the coordinate of the first location by operating the first transform on a coordinate of the first pixel.

3. The machine vision system of claim 1, wherein the processor is configured to determine, for a second pixel of the plurality of pixels, a coordinate of a corresponding second location in the first image by adding a constant to the coordinate of the first location.

4. The machine vision system of claim 3, wherein the processor is configured to:
select a second one of the plurality of kernels based on a sub-pixel phase associated with the coordinate of the second location; and
generate the second image from the first image by, in part, applying the second one of the plurality of kernels on at least one pixel around the second location in the first image to determine an image value for the second pixel in the second image.

5. The machine vision system of claim 1, wherein the plurality of kernels correspond to an identical function that is sampled at a plurality of sub-phases.

6. The machine vision system of claim 1, wherein the processor is configured to:
receive a second transform associated with the second image, wherein the second transform relates the second image to a third image, and is constrained to map a plurality of pixels along a dimension of the third image to a plurality of locations along the dimension of the second image;
determine, for a first pixel of the third image, a coordinate of a corresponding first location of the third image;
select one of the plurality of kernels based on a sub-pixel phase associated with the coordinate of the first location in the third image; and
generate the third image from the second image by, in part, applying the one of the plurality of kernels on at least one pixel around the first location of the third image to determine an image value for the first pixel of the third image.

7. The machine vision system of claim 6, wherein the first transform and the second transform collectively represent an affine transformation.

8. The machine vision system of claim 1, wherein the first transform comprises a down-sampling operation.

9. The machine vision system of claim 1, wherein the first transform comprises a first transformation matrix.

10. A computerized method comprising:
receiving a first image and a first transform associated with the first image, wherein the first transform relates the first image to a second image, and is constrained to map a plurality of pixels along a dimension of the second image to a plurality of locations along a dimension of the first image;
determining, for a first pixel of the plurality of pixels, a coordinate of a corresponding first location in the first image;
selecting one of a plurality of kernels based on a sub-pixel phase associated with the coordinate of the first location, wherein the sub-pixel phase is indicative of a sub-pixel offset of the first location from a pixel grid of the first image; and generating the second image from the first image by, in part, applying the selected kernel on at least one pixel around the first location in the first image to determine an image value for the first pixel in the second image.

11. The computerized method of claim 10, wherein determining the coordinate of the first location comprises operating the first transform on a coordinate of the first pixel.

12. The computerized method of claim 10, further comprising determining, for a second pixel of the plurality of pixels, a coordinate of a corresponding second location in the first image by adding a constant to the coordinate of the first location.

13. The computerized method of claim 12, further comprising:
- selecting a second one of the plurality of kernels based on a sub-pixel phase associated with the coordinate of the second location; and
- generating the second image from the first image by, in part, applying the second one of the plurality of kernels on at least one pixel around the second location in the first image to determine an image value for the second pixel in the second image.

14. The computerized method of claim 10, further comprising:
- receiving a second transform associated with the second image, wherein the second transform relates the second image to a third image, and is constrained to map a plurality of pixels along a dimension of the third image to a plurality of locations along the dimension of the second image;
- determining, for a first pixel of the third image, a coordinate of a corresponding first location of the third image;
- selecting one of the plurality of kernels based on a sub-pixel phase associated with the coordinate of the first location in the third image; and
- generating the third image from the second image by, in part, applying the one of the plurality of kernels on at least one pixel around the first location of the third image to determine an image value for the first pixel of the third image.

15. The computerized method of claim 14, wherein the first transform and the second transform collectively represent an affine transformation.

16. The computerized method of claim 10, wherein the first transform comprises a down-sampling operation.

17. The computerized method of claim 10, wherein the first transform comprises a first transformation matrix.

18. A non-transitory computer readable medium having executable instructions associated with a homography decomposition module and a homography removal module, operable to cause a machine vision system to:
- receive a first image and a first transform associated with the first image, wherein the first transform relates the first image to a second image, and is constrained to map a plurality of pixels along a dimension of the second image to a plurality of locations along a dimension of the first image;
- determine, for a first pixel of the plurality of pixels, a coordinate of a corresponding first location in the first image;
- select one of a plurality of kernels based on a sub-pixel phase associated with the coordinate of the first location, wherein the sub-pixel phase is indicative of a sub-pixel offset of the first location from a pixel grid of the first image; and
- generate the second image from the first image by, in part, applying the selected kernel on at least one pixel around the first location in the first image to determine an image value for the first pixel in the second image.

19. The non-transitory computer readable medium of claim 18, wherein the executable instructions are further operable to cause the machine vision system to determine, for a second pixel of the plurality of pixels, a coordinate of a corresponding second location in the first image by adding a constant to the coordinate of the first location.

20. The non-transitory computer readable medium of claim 18, wherein the plurality of kernels correspond to an identical function that is sampled at a plurality of sub-phases.

* * * * *